United States Patent [19]

Upadhyayula et al.

[11] 3,768,029

[45] Oct. 23, 1973

[54] TEMPERATURE COMPENSATION OF TRANSFERRED ELECTRON AMPLIFIERS

[75] Inventors: Chainulu Lakshminarasimha Upadhyayula, Cranbury; Barry Stuart Perlman, Hightstown, both of N.J.

[73] Assignee: RCA Corporation, New York, N.Y.

[22] Filed: Sept. 11, 9172

[21] Appl. No.: 287,712

[52] U.S. Cl. .................................... 330/5, 330/127

[51] Int. Cl. ............................................ H03f 3/10

[58] Field of Search ........................................ 330/5

*Primary Examiner*—Roy Lake

*Assistant Examiner*—Darwin R. Hostetter

*Attorney*—Edward J. Norton et al.

[57] ABSTRACT

A stable linear transferred electron amplifier operable over a wide temperature range with relatively constant gain and band width is provided by sensing the temperature changes and by varying the operating bias to the amplifier in accordance with those temperature changes.

4 Claims, 4 Drawing Figures

TEMPERATURE COMPENSATION OF TRANSFERRED ELECTRON AMPLIFIERS

This invention relates to transferred electron amplifiers and more particularly to bulk type transferred electron amplifiers where the active region is supercritically doped.

Supercritically doped bulk type transferred electron devices are known and are presently considered for use as high power solid-state microwave amplifiers. The term "supercritically" doped refers to transferred electron devices such as those made of epitaxial gallium aresenide (GaAs) where the bulk region has an nL product at room temperature greater than about $5 \times 10^{11}cm^{-2}$. The term "$n$"in the above product is the carrier density of the bulk material and L is the length of the sample. When such a bulk material has a D.C. (direct current) electric field bias thereacross that exceeds a given threshold, such as about 3 kilovolts per cm., for example, the drift velocity of the electrons as a function of the electric field decreases. Transfer of electrons from high velocity states to low velocity states takes place in a relatively short time compared to the frequency of the microwave signal, giving rise to a bulk negative resistance. When the device is biased two–three times the threshold voltage, the negative resistance exhibited by the device can be utilized for reflection type amplification of microwave signals. This two–three times threshold voltage for a device that has a required threshold voltage of 6 volts is 12 to 18 volts.

When the ambient termperature changes, the transferred electron amplifier device parameters such as the drift velocity and differential mobility vary. When these device parameters change the amplifier performance change as the operating point on the device I-V characteristic is shifted.

Briefly, in accordance with the present invention a transferred electron amplifier is provided for amplifying microwave signals at or near the transit time frequency. The amplifier includes a bulk transferred electron device, means for loading the device and means for applying an electric field bias across the device. The device has an active region characterized by the doping density times the length of the material being greater than $5 \times 10^{11}cm^{-2}$. The device provides a given linear stable amplification and operating characteristic when biased with a given bias voltage sufficiently above that of two times threshold. The bias is varied directly as a function of temperature to maintain the operating characteristics of said amplifier.

DETAILED DESCRIPTION

A more detailed description of the present invention follows in conjunction with the following drawings wherein.

Figures 1, 2:
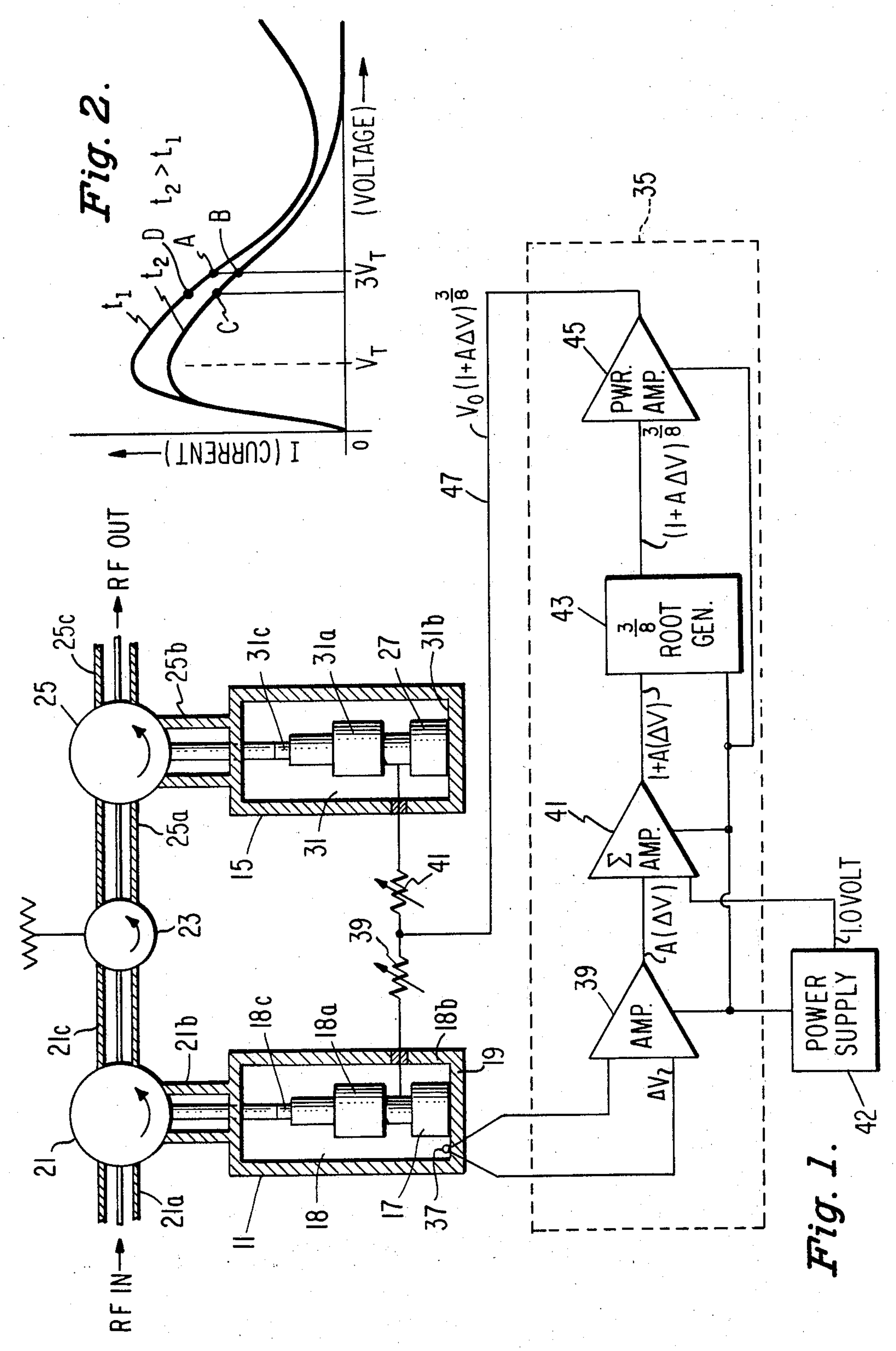
FIG. 1 is a diagram of a temperature compensated bias regulated transferred electron amplifier according to the present invention.
FIG. 2 is an I-V plot of the same transferred electron amplifier at two temperatures.

Referring to FIG. 1, there is illustrated a typical pair of cascaded reflection type transferred electron amplifiers 11 and 15. Transferred electron amplifier 11 includes a packaged bulk device 17 mounted in a coaxial line 18 with the inner conductor 18*a* fixed to one end of the device 17 and the outer conductor 18*b* fixed to the opposite end of the device 17. The device 17 is fixed at a reflecting shorted end 19 of the coaxial transmission line 18. Circulator 21 receives the R.F. signal to be amplified at arm 21*a* and this R.F. signal is coupled via the circulator 21 to coaxial transmission line 18. The reflected amplified signal along the transmission line 18 is coupled to the circulator arm 21*b* and is coupled out of arm 21*c*, through isolating circulator 23 to circulator 25.

The amplifier R.F. signal at circulator 25 is coupled via arms 25*a* and 25*b* to the second transferred electron amplifier 15. The second transferred electron amplifier 15 includes a bulk device 27 similarly mounted in a second coaxial transmission line 31 having inner conductor 31*a* and outer conductor 31*b*. The reflected amplified R.F. signals are then coupled through circulator 25 to the output arm 25*c*. Impedance matching of the device 17 to the circulator 21 is provided by stepped portion 18*c* of inner conductor 18*a*. Similarly, impedance matching of the device 27 is provided by the stepped portion 31*c* of inner conductor 31*a* of coaxial transmission line 31.

A D.C. electric field bias across the devices 17 and 27 is provided by a bias regulation circuit 35. The D.C. electric field bias is coupled over wire 47 and resistor 39 to inner conductor 18*a* and resistor 41 to inner conductor 31*a*. The D.C. current is blocked from the R.F. output by capacitors 18 and 31.

The packaged devices 17 and 27 are bulk gallium arsenide (GaAs) material where the material is "supercritically" doped. The term "supercritically" doped refers to transferred electron devics where the bulk region has an nL product greater than $5 \times 10^{11}cm^{-2}$ where $n$ is the carrier density of the bulk material and L equals the length of the sample. A more complete description of each of these amplifiers 11 and 15 may be had by reference to U. S. Pat. No. 3,644,839 of Barry Stuart Perlman and Walsh dated Feb. 22, 1972. The stepped inner conductor sections 18*c* and 31*c* in applicant's arrangement replaces the tuning stubs 31, 32 and 33 in the cited patent. In these transferred electron amplifiers stable linear amplification was achieved when the bias voltages were about 2.5 to 3 times threshold. Threshold is that electric field such as about 3 kilovolts per centimeter, where the drift velocity of the conduction of electrons as a function of the electric field decreases. A transfer of electrons from high velocity states takes place in a short time compared to the applied microwave R.F. signal. This gives rise to a negative resistance.

Referring to FIG. 2, there is illustrated an I-V plot of a transferred electron amplifier as reflection amplifier 11. Curve $t_1$ is an I-V plot of the amplifier 11 with the device 17 at a first initial temperature. At a threshold bias level ($V_{Th}$) of, for example, 6 volts (a 20 micron length device for CW operation at 5 GHz), a negative resistance slope occurs. When the device is biased at 3 $V_{Th}$ or three times threshold (18 volts) stabilization of the device occurs and the operating point on the device is at point A on curve $t_1$.

When the device temperature increases to temperature $t_2$ the device parameters such as mobility and differential mobility vary. The effect of this temperature increase causes the device to operate with an I-V plot that follows curve $t_2$. The operating point of the device is now changed to point B. Because of the operating point shift, the amplifier gain and bandwidth vary considerably when the ambient temperature is varied.

In accordance with the present invention compensation is achieved by changing the operating bias so as to minimize the variation in device characteristics when temperature changes and hence stabilize the amplifier response when the ambient temperature varies. When the temperature increases as above, for example, the bias is made to decrease and in the above case the operating point is shifted from point B to point C on curve $t_2$. Conversely, if the initial temperature was $t_2$ and the device was operated about point C and the temperature decreased, the bias is made to increase so the operating point is about point A and not about point D.

Figure 3:
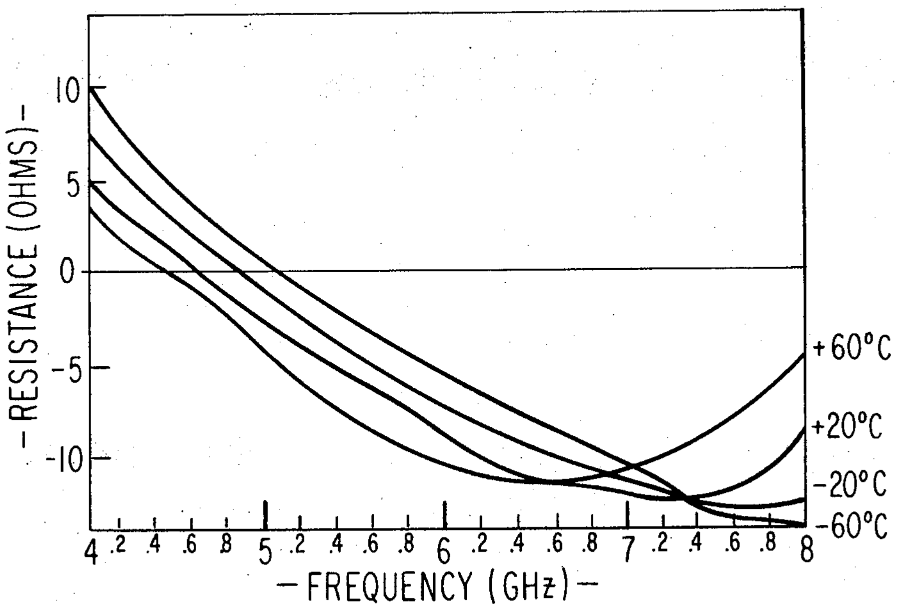
FIG. 3 is a plot of R.F. resistance of a transferred electron amplifier device as a function of frequency with temperature as a parameter.

FIG. 3 is a plot of R.F. resistance of an uncompensated transferred electron amplifier device as described above, as a function of frequency with temperature as a parameter. As the temperature is decreased, the frequency above which the device exhibits negative resistance occurs is increased. The frequency at which the maximum value of negative resistance occurs is decreased as the temperature increases.

Figure 4:
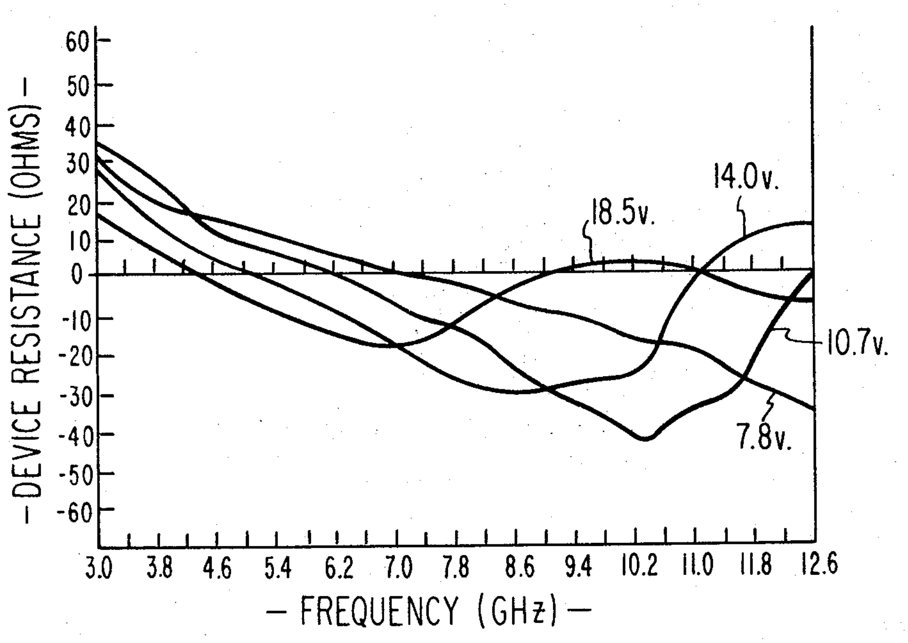
FIG. 4 is a plot of R.F. resistance of the same transferred electron device as a function of frequency with bias voltage as a parameter.

FIG. 4 illustrates the effect that bias has on the device negative resistance. At higher bias levels the negative resistance bandwidth is shifted to a lower frequency. The magnitude of the negative resistance also decreased when the bias was increased. It can be seen, therefore, that the variation in the device characteristics due to an increase in bias are in an opposite direction to the changes due to an increase in the temperature. By varying the bias of each amplifier a given amount that is inversely proportional to temperature,- gain and bandwidth characteristics of the amplifier can be maintained substantially constant with varying temperature.

Although as taught herein temperature compensation can be achieved by varying the bias a given amount that is inversely proportioned to temperature, an automatic control to achieve temperature compensation and to achieve closer amplifier tolerances with respect to gain and bandwidth characteristics of the amplifier with change in temperature requires that the bias voltages vary according to some dependence with temperature. By varying the bias in the same way as the mobility ($v$) of the carriers in the bulk material is varied with temperature, the sample current can be maintained constant for all temperatures. When the device conductance is kept constant at all temperatures, the R.F characteristics remain unchanged which means that the amplifier performance is unchanged. In accordance with the present invention, the operating bias is varied as $V(T) = V_o\,(T_o/T)^{x/4}$ where $V(T)$ = Amplifier operating bias at any new operating ambient temperature $T$.

$V_o$ = Amplifier operating bias at initial temperature $T_o$.

$T_o$ = Initial temperature.

T = Any new operating ambient temperature.

$x$ = A number that lies between one-half and three-halves and is associated with the mobility of the material. The number is typically three-halves.

When $x$ equals three-halves, $V(T) = V_o\,(T_o/T)^{3/8}$.

In accordance with the arrangement shown in FIG. 1, the compensation may be achieved by the bias regulation and conditioning device 35. A sensistor 37 (a temperature variable resistor) may be located, for example, in the coaxial transmission line 18 near the device 17. The sensistor 37 is responsive to temperature changes to provide voltage changes $\Delta V$ to amplifier 39. The amplified voltage changes $A\Delta V$ from amplifier 41 are applied to one terminal of a summing amplifier 41. 1 volt, for example, from the power supply is coupled to the second input terminal of the summing amplifier 41 to provide output from the summing amplifier 41 a voltage value of $1 + A\Delta V$. The output from the summing amplifier is then applied to a function generator 43 and more particularly to a 3/8 root function generator to provide at its output $(1 + A\Delta V)^{3/8}$. The output from the function generator is then applied to a first terminal of power amplifier 45 the gain of which is $V_o$. This initial voltage $V_o$ is the initial biasing voltage for the amplifier for obtaining the desired operating characteristics of the amplifier. The resultant output from the power amplifier 45 is $V_o\,(1 + A\Delta V)^{3/8}$ or by conversion this is equal to $V_o\,(T_o/T)^{3/8}$ where $\Delta V \alpha T_o - T$. This voltage is applied via wire 47 to the devices 17 and 27. As changes occur in temperature the change $\Delta V$ would then be converted to provide the proper bias conditions on the devices to maintain constant operating characteristics. Since three-eighths is a value sufficiently close to one-half, adequate compensation for temperature changes can be achieved by the use of a square root generator in place of the more complex 3/8 root generator 43 described above.

The formula $V = V_o\,(T_o/T)^{3/8}$ was derived first by determining the temperature dependence of differential mobility $dv/dE$. Based on this consideration a relation for the electric field ($E$) and temperature is obtained and from this is obtained the biasing voltage $V(T)$ for a given temperature. To determine the temperature dependence of differential mobility ($dv/dE$), let us consider the analytical expression for the $v$-$E$ characteristic suggested by H. Kroemer entitled "Detailed Theory of Negative Conductance of Bulk Negative Mobility Ampliifers in the Limit of Zero Ion Density" in Sept. 1967 IEEE Transactions Electron Devices, Vol. ED-14, No. 9, pages 476–492.

$$v(E) = \mu_o\ 1 + 0.05\ (E/E_o)^4/\ 1 + (E/E_o)^4\ E$$

where $E$ is $> E_o$ threshold field, $v(E)$ is the drift velocity of the carriers as a function of the electric field $E$, $\mu_o$ is the carrier mobility at the initial temperature $T_o$ for electric field below $E_o$, and $E_o$ is the threshold field. $\delta v/\delta E = \mu_o\ [(1 + 0.25\ (E/E_o)^4\ /1 + (E/E_o)^4) - 1 + 0.05\ (E/E_o)^4\ /[1 + (E/E_o)^4]^2 \cdot 4(E/E_o)^4]$ for amplifier operation $E/E_o > 2$ or $(E/E_o)^4 >> 1$. Then $$\delta v/\delta E = \mu_o\ (E_o/E)^4\ [-3 + 0.05\ (E/E_o)^4]$$

The temperature dependence of velocity ($v$) and differential mobility ($dv/dE$) arises from the temperature dependence of $\mu_o$, i.e., the mobility at any temperature $\mu(T) = \mu_o\ (T_o/T)^x$, where $x$ lies between one-half and three-halves in the temperature range of our interest. Thus $$\delta v/\delta E = \mu_o\ (T_o/T)^x\ (E_o/E)^4\ [-3 + 0.05\ (E/E_o)^4]$$

Variations in drift velocity ($v$) and differential mobility ($dv/dE$) due to temperature will reflect as similar changes in the device current and conductance. To keep the conductance constant, the electric field or bias V should be increased when the temperature is decreased. From the considerations of the differential mobility discussed earlier we can obtain a relation for the electric field (or bias) V as a function of temperature as follows:

Let the value of $dv/dE$ be kept constant and it is equal to $-\mu$. Then $$(T_o/T)^x\ [3(E_o/E)^4 - 0.05] = \mu/\mu_o = C$$

Rearranging the terms $$E = E_o\ [3/c(T/T_o)^x + 0.05]$$

When the temperature is changed from $T_o$ to $T$, the electric field necessary to keep the differential mobility constant is given by the above expression. For temperatures above 300° K, it appears that the negative differential mobility $dv/dE$ follows closely $T^{-3/2}$ law. See J. G. Ruch and W. Fawcett's article entitled "Temperature Dependence of Transport Properties of GaAs Determined by a Monte Carlo Method," J. App. Phy. Vol. 41, No. 9, pages 3,843–3849, August 1970. The $T^{-3/2}$ dependence is characteristic of lattice scattering although optical polar scattering (i.e., $\mu \alpha T^{-1/2}$) is supposed to be dominant in GaAs. Assuming the temperature dependence of differential mobility to be $T^{-3/2}$, the electric field necessary to maintain the device characteristics with temperature nearly constant becomes $$E = E_o\ [3/c(T/T_o)^x + 0.05]$$

$$E = E_0(3/c)^{1/4}[(T/T_0)^{-x/4} - (1/4)(.05/c)(T/T_0)^{-5x/4} + \ldots]$$

$$= E_0(3/c)^{1/4}[(T_0/T)^{x/4} - (0.0125/c)(T_0/T)^{5x/4} + \ldots]$$

The bias voltage $V = El$ where $E$ is the electric field $E$ above and $l$ is the device active layer thickness.

$$V = V_o'\ [K' + (3/c)^{1/4}\ (T/T_o)^{3/8}]$$

where $V_o' = E_o l$, or threshold bias $V_{Th}$ $V_o'\ (3/c)^{1/4} = V_o$ = operating bias for amplifier at initial temperature $T_o$ which value is about two–three times threshold voltage ($V_{Th}$).

$$K' = E_o\ (3/c)^{1/4}\ [-0.0125/c\ (T_o/T)^{5x/4} + \ldots]$$

$$V = V_o\ [(T_o/T)^{x/4} + K]$$

where $K$ = small temperature dependent constant and is equal to $K'\ (c/3)^{1/4}$ $V_o$ = amplifier operating bias voltage at temperature $T_o$.

$V$ = amplifier operating bias at any new operating ambient temperature $T$.

Since $K$ is relatively small on the order of less than 10 percent, it may be neglected yielding:

$V = V_o(T_o/T)^{x/4}$ and when $x$ equals three-halves $V = V_o(T_o/T)^{3/8}$

What is claimed is:

1. In a transferred electron amplifier for amplifying microwave signals at or near the transit time frequency wherein said amplifier includes a bulk transferred electron semiconductor device, means for loading said device and means for applying an electric field bias across said device, said device having an active region between opposite terminal ends thereof characterized by a product of its length between terminal ends and doping density of the material in the active region be greater than $5 \times 10^{11}cm^{-2}$, said biasing means providing an electric field bias sufficiently above that of two times the threshold value where a transfer of electrons from a high to a low mobility sub-band in said device occurs so that with said loading means said amplifier provides a given stabilized amplification and operating characteristic, said device in response to temperature variation thereof inherently causing variations in the gain and other operating characteristics of said amplifier, the improvement comprising in combination therewith of means for inversely varying said bias as a function of temperature which maintains substantially constant the operating characteristics of said amplifier whenever said device varies in temperature.

2. The combination claimed in claim 1, wherein said electric field bias is varied in accordance with the variation of the differential mobility in said device with temperature.

3. The combination claimed in claim 1, wherein the operating bias is varied as $V(T) = V_o\ (T_o/T)^{x/4}$ where $V(T)$ = operating bias at temperatures $T$ $V(T_o)$ = operating bias at temperature $T_o$ $T_o$ = initial temperature $T$ = any new temperature $x$ = a number that lies between one-half and three-halves and is associated with the mobility of the material.

4. The combination claimed in claim 3, wherein $x$ is substantially three-halves.

* * * * *

UNITED STATES PATENT OFFICE
CERTIFICATE OF CORRECTION

Patent No. 3,768,029 Dated October 23, 1973

Inventor(s) C. L. Upadhyayula and B. S. Perlman

It is certified that error appears in the above-identified patent and that said Letters Patent are hereby corrected as shown below:

Column 5, line 14 and Column 5, line 31 change

"$E = E_0 \left[\frac{3}{c(T/T_0)^x + 0.05}\right]$" to read

--$E = E_0 \left[\frac{3}{c(T/T_0)^x + 0.05}\right]^{1/4}$ --.

Signed and sealed this 23rd day of April 1974.

(SEAL)
Attest:

EDWARD M.FLETCHER,JR.
Attesting Officer

C. MARSHALL DANN
Commissioner of Patents